(12) United States Patent
Kodo et al.

(10) Patent No.: US 8,977,455 B2
(45) Date of Patent: Mar. 10, 2015

(54) POWER TRANSMISSION APPARATUS AND METHOD FOR CONTROLLING POWER TRANSMISSION APPARATUS

(75) Inventors: Satoshi Kodo, Wako (JP); Tsunehiro Kobayashi, Wako (JP); Mitsuhiro Iwadare, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 513 days.

(21) Appl. No.: 13/403,996

(22) Filed: Feb. 24, 2012

(65) Prior Publication Data

US 2012/0240695 A1 Sep. 27, 2012

(30) Foreign Application Priority Data

Mar. 25, 2011 (JP) ................................. 2011-067538

(51) Int. Cl.
*G06F 7/00* (2006.01)
*F16H 29/04* (2006.01)
*F16H 29/22* (2006.01)

(52) U.S. Cl.
CPC ................. *F16H 29/04* (2013.01); *F16H 29/22* (2013.01)
USPC ................. 701/67; 701/22; 477/5; 180/65.21

(58) Field of Classification Search
CPC ........ F16H 29/04; F16H 29/22; B60W 10/10; B60W 10/101; B60W 10/103; B60W 10/105; B60W 10/107; B60W 10/108; B60W 10/109; B60W 10/11; B60W 10/111; B60W 10/113; B60W 10/115; B60W 20/1062; B60W 20/30
See application file for complete search history.

(56) References Cited

U.S. PATENT DOCUMENTS

| | | | |
|---|---|---|---|
| 6,941,830 B2 * | 9/2005 | Ibamoto et al. | 74/339 |
| 7,108,087 B2 * | 9/2006 | Imai | 180/65.23 |
| 7,108,626 B2 | 9/2006 | Friedmann | |
| 7,194,348 B2 * | 3/2007 | Wada et al. | 701/55 |

FOREIGN PATENT DOCUMENTS

JP    2005-502543    1/2005

* cited by examiner

*Primary Examiner* — David D Le
(74) *Attorney, Agent, or Firm* — Mori & Ward, LLP (57) ABSTRACT

A power transmission apparatus includes a drive shaft, a driven shaft, a first transmission device, a first one-way power transmission mechanism, a second transmission device, a second one-way power transmission mechanism, and a controller. The first transmission device is to change power of the drive shaft. The first one-way power transmission mechanism is to transmit power changed by the first transmission device only in one direction to the driven shaft. The second transmission device is to change power of the driven shaft. The second one-way power transmission mechanism is to transmit power changed by the second transmission device only in one direction to the drive shaft. The controller is configured to change ratios of the first transmission device and the second transmission device. The controller is configured to make the ratio of the first transmission device larger than the ratio of the second transmission device.

8 Claims, 5 Drawing Sheets

POWER TRANSMISSION APPARATUS AND METHOD FOR CONTROLLING POWER TRANSMISSION APPARATUS

CROSS-REFERENCE TO RELATED APPLICATIONS

The present application claims priority under 35 U.S.C. §119 to Japanese Patent Application No. 2011-067538, filed Mar. 25, 2011, entitled "Power transmission device and method for controlling same." The contents of this application are incorporated herein by reference in their entirety.

BACKGROUND OF THE INVENTION

1. Field of the Invention

The present invention relates to a power transmission apparatus and a method for controlling the power transmission apparatus.

2. Discussion of the Background

There has been proposed a drive device (power transmission device) that has an eccentric body drive unit (transmission) using a lever crank mechanism, and a lockable freewheel unit (one-way clutch mechanism) and that can steplessly change the ratio from a drive shaft to a driven shaft (see Japanese Unexamined Patent Application Publication (Translation of PCT Application) No. 2005-502543).

SUMMARY OF THE INVENTION

According to one aspect of the present invention, a power transmission apparatus includes a drive shaft, a driven shaft, a first transmission device, a first one-way power transmission mechanism, a second transmission device, a second one-way power transmission mechanism, and a controller. The first transmission device is to change power of the drive shaft. The first one-way power transmission mechanism is to transmit power changed by the first transmission device only in one direction to the driven shaft. The second transmission device is to change power of the driven shaft. The second one-way power transmission mechanism is to transmit power changed by the second transmission device only in one direction to the drive shaft. The controller is configured to change ratios of the first transmission device and the second transmission device. The controller is configured to make the ratio of the first transmission device larger than the ratio of the second transmission device.

According to another aspect of the present invention, a method is for controlling a power transmission apparatus including a drive shaft, a driven shaft, a first transmission device to change power of the drive shaft, a first one-way power transmission mechanism to transmit power changed by the first transmission device only in one direction to the driven shaft, a second transmission device to change power of the driven shaft, a second one-way power transmission mechanism to transmit power changed by the second transmission device only in one direction to the drive shaft, and a controller configured to change ratios of the first transmission device and the second transmission device. The method includes making the ratio of the first transmission device larger than the ratio of the second transmission device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 5A and 5B relate to the power transmission device.

DESCRIPTION OF THE EMBODIMENTS

The embodiments will now be described with reference to the accompanying drawings, wherein like reference numerals designate corresponding or identical elements throughout the various drawings.

In each figure, the same reference numerals will be used to designate the same components, and redundant description will be omitted.

Configuration of Power Transmission Device

Figure 1:
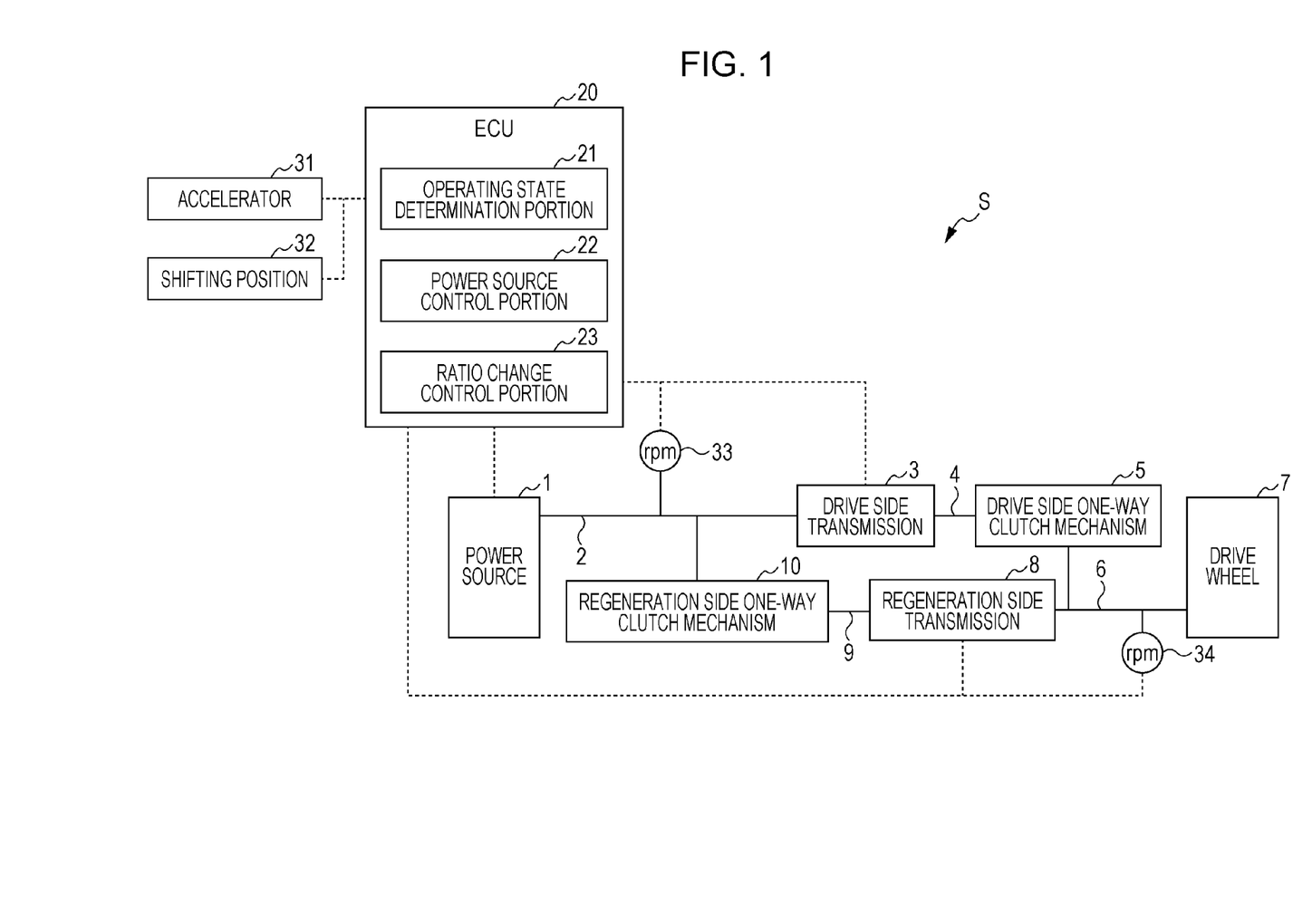
FIG. 1 is a configuration diagram of a power transmission device according to the embodiment.

FIG. 1 is a configuration diagram of a power transmission device S according to this embodiment. The power transmission device S according to this embodiment shown in FIG. 1 is mounted on a vehicle (moving body) (not shown), is a device that transmits drive force generated in a power source 1 to a drive wheel 7, and generates drive force of the vehicle (moving body). Although only one drive wheel 7 is shown in FIG. 1, the power transmission device S may include a plurality of drive wheels 7. The vehicle (moving body) is not limited to a four-wheel vehicle and may be a two-wheel vehicle or a three-wheel vehicle. As shown in FIG. 1, the power transmission device S has a power source 1, a drive shaft 2, a drive side transmission 3, a drive side transmission output shaft 4, a drive side one-way clutch mechanism 5, an output shaft 6, a drive wheel 7, a regeneration side transmission 8, a regeneration side transmission output shaft 9, a regeneration side one-way clutch mechanism 10, and an ECU 20 (Electronic Control Unit).

The power source 1 generates drive force and rotationally drives the drive shaft 2. Although the power source 1 will be discussed as being an internal combustion (engine), the power source 1 is not limited to this and may be, for example, an electric machine (motor).

The drive shaft 2 is rotationally driven by the power source 1 and inputs rotational force into the drive side transmission 3. The drive shaft 2 is provided with a drive shaft rotation speed detection mechanism 33 that detects the rotation speed of the drive shaft 2. The drive shaft rotation speed detection mechanism 33 transmits a signal showing the detected rotation speed to the ECU 20.

The drive side transmission 3 changes the rotational force of the drive shaft 2 on the basis of a drive side ratio set by the ECU 20 and thereby drives the drive side transmission output shaft 4. The drive side transmission 3 may be a continuously variable transmission that can change the ratio steplessly or a multi-stage transmission that changes the ratio in stages. Since the drive side transmission 3 is followed by the drive side one-way clutch mechanism 5, the drive side transmission 3 may be a transmission that converts the rotational motion of the drive shaft 2 into a rocking motion using "a lever crank mechanism" such as that shown in Japanese Unexamined Patent Application Publication (Translation of PCT Application) No. 2005-502543). Because of intermittent drive force, a transmission using a lever crank mechanism preferably has a plurality of paths.

Here, the drive side ratio, which is the ratio of the drive side transmission 3, will be defined as "the rotation speed on the side of the power source 1/the rotation speed on the side of the drive wheel 7." That is to say, it will be defined as "the rotation speed of the drive shaft 2/the rotation speed of the drive side transmission output shaft 4." For this reason, the drive side ratio will be defined as the general transmission ratio of transmissions (the rotation speed on the input shaft side of the transmission/the rotation speed on the output shaft side of the transmission).

When the rotation speed of the drive side transmission output shaft 4 exceeds the rotation speed of the output shaft 6, the drive side one-way clutch mechanism 5 transmits drive force. On the other hand, when the rotation speed of the drive side transmission output shaft 4 is lower than the rotation speed of the output shaft 6, the drive side one-way clutch mechanism 5 does not transmit drive force.

The output shaft 6 is rotationally driven, through the drive side one-way clutch mechanism 5, by the drive force from the power source 1 changed in the drive side transmission 3. The output shaft 6 is provided with an output shaft rotation speed detection mechanism 34 that detects the rotation speed of the output shaft 6. The output shaft rotation speed detection mechanism 34 transmits a signal showing the detected rotation speed to the ECU 20.

The drive wheel 7 is attached to the output shaft 6 so that the vehicle on which the power transmission device S is mounted can move. The output shaft 6 is connected to the regeneration side transmission 8.

The regeneration side transmission 8 changes the rotational force of the output shaft 6 on the basis of a regeneration side ratio set by the ECU 20 and thereby drives the regeneration side transmission output shaft 9. The regeneration side transmission 8 may be a continuously variable transmission that can change the ratio steplessly or a multi-stage transmission that changes the ratio in stages. Since the regeneration side transmission 8 is followed by the regeneration side one-way clutch mechanism 10, the regeneration side transmission 8 may be a transmission that converts the rotational motion of the output shaft 6 into a rocking motion using "a lever crank mechanism" such as that shown in Japanese Unexamined Patent Application Publication (Translation of PCT Application) No. 2005-502543). Because of intermittent drive force, a transmission using a lever crank mechanism preferably has a plurality of paths.

The drive side transmission 3 and the regeneration side transmission 8 both may be continuously variable transmissions or both may be multi-stage transmissions, or one of them may be a continuously variable transmission and the other may be a multi-stage transmission. In the case where the drive side transmission 3 and the regeneration side transmission 8 are transmissions using a lever crank mechanism, the paths of the regeneration side transmission 8 may be fewer than the paths of the drive side transmission 3.

Here, the regeneration side ratio, which is the ratio of the regeneration side transmission 8, will be defined as "the rotation speed on the side of the power source 1/the rotation speed on the side of the drive wheel 7." That is to say, it will be defined as "the rotation speed of the regeneration side transmission output shaft 9/the rotation speed of the output shaft 6." For this reason, the regeneration side ratio will be defined as the reciprocal of the general transmission ratio of transmissions (the rotation speed on the input shaft side of the transmission/the rotation speed on the output shaft side of the transmission).

When the rotation speed of the regeneration side transmission output shaft 9 exceeds the rotation speed of the drive shaft 2, the regeneration side one-way clutch mechanism 10 transmits drive force. On the other hand, when the rotation speed of the regeneration side transmission output shaft 9 is lower than the rotation speed of the drive shaft 2, the regeneration side one-way clutch mechanism 10 does not transmit drive force.

The ECU 20 has an operating state determination portion 21 that determines the operating state of the power transmission device S, a power source control portion 22 that controls the power source 1, and a ratio change control portion 23 that controls the ratios of the drive side transmission 3 and the regeneration side transmission 8. Signals of the opening of the accelerator 31, the shifting position 32, the rotation speed of the drive shaft rotation speed detection mechanism 33, the rotation speed of the output shaft rotation speed detection mechanism 34 are input into the ECU 20.

Operation Example of Power Transmission Device S

Figure 4A:
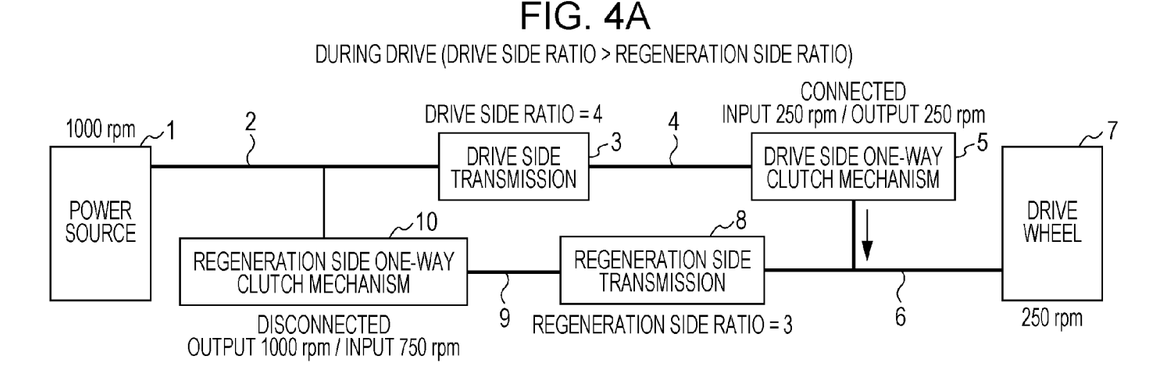
FIG. 4A illustrates the operation during drive of the power transmission device according to this embodiment.
Figure 4B:
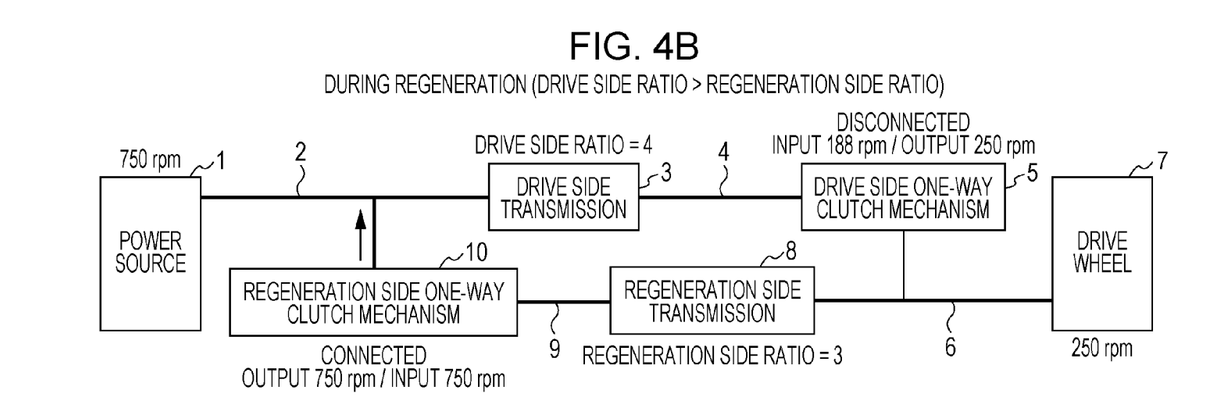
FIG. 4B illustrates the operation during regeneration of the power transmission device according to this embodiment.

With reference to FIGS. 4A and 4B, an operation example of the power transmission device S will be described. In FIGS. 4A and 4B, the ECU 20 and others are omitted.

FIG. 4A illustrates the operation during drive of the power transmission device S according to this embodiment. A description will be given, for example, of a case where the ratio of the drive side transmission 3 (drive side ratio) is 4, the ratio of the regeneration side transmission 8 (regeneration side ratio) is 3, and the power source 1 rotates the drive shaft 2 at 1000 rpm (revolutions per minute).

The drive shaft 2 is rotated at 1000 rpm by the drive force generated in the power source 1, and the rotation is transmitted to the drive side transmission 3. By the drive side transmission 3, the drive side transmission output shaft 4 is rotated at 250 rpm (=1000 rpm/4). Through the drive side one-way clutch mechanism 5 in a connected state, the output shaft 6 is rotated at 250 rpm. The drive wheel 7 connected to the output shaft 6 is rotated at 250 rpm.

On the other hand, since the output shaft 6 rotates at 250 rpm, the rotation speed is changed in the regeneration side transmission 8, and the regeneration side transmission output shaft 9 rotates at 750 rpm. The regeneration side transmission output shaft 9, which is the input side of the regeneration side one-way clutch mechanism 10, rotates at 750 rpm, whereas the drive shaft 2, which is the output side of the regeneration side one-way clutch mechanism 10, rotates at 1000 rpm. Therefore, the regeneration side one-way clutch mechanism 10 is disconnected.

Since the drive side one-way clutch mechanism 5 is connected and the regeneration side one-way clutch mechanism 10 is disconnected as described above, the drive force of the power source 1 (the drive shaft 2) is transmitted to the drive wheel 7 (the output shaft 6).

FIG. 4B illustrates the operation during regeneration of the power transmission device S according to this embodiment. A description will be given, for example, of a case where the ratio of the drive side transmission 3 (drive side ratio) is 4, the ratio of the regeneration side transmission 8 (regeneration side ratio) is 3, and the drive force generation of the power source 1 is stopped when the drive wheel 7 is rotating at 250 rpm (revolutions per minute).

Since the drive wheel 7 rotates at 250 rpm, the output shaft 6 also rotates at the same rotation speed. By the regeneration side transmission 8 connected to the output shaft 6, the regeneration side transmission output shaft 9 is rotated at 750 rpm (=250 rpm×3). Through the regeneration side one-way clutch mechanism 10 in a connected state, the drive shaft 2 is rotated at 750 rpm.

On the other hand, since the drive shaft 2 rotates at 750 rpm, the rotation speed is changed in the drive side transmission 3, and the drive side transmission output shaft 4 rotates at about 188 rpm. The drive side transmission output shaft 4, which is the input side of the drive side one-way clutch mechanism 5, rotates at about 188 rpm, whereas the output shaft 6, which is the output side of the drive side one-way clutch mechanism 5, rotates at 250 rpm. Therefore, the drive side one-way clutch mechanism 5 is disconnected.

Since the drive side one-way clutch mechanism 5 is disconnected and the regeneration side one-way clutch mechanism 10 is connected as described above, drive force is recovered from the drive wheel 7 (the output shaft 6) to the power source 1 (the drive shaft 2).

Figure 5A:
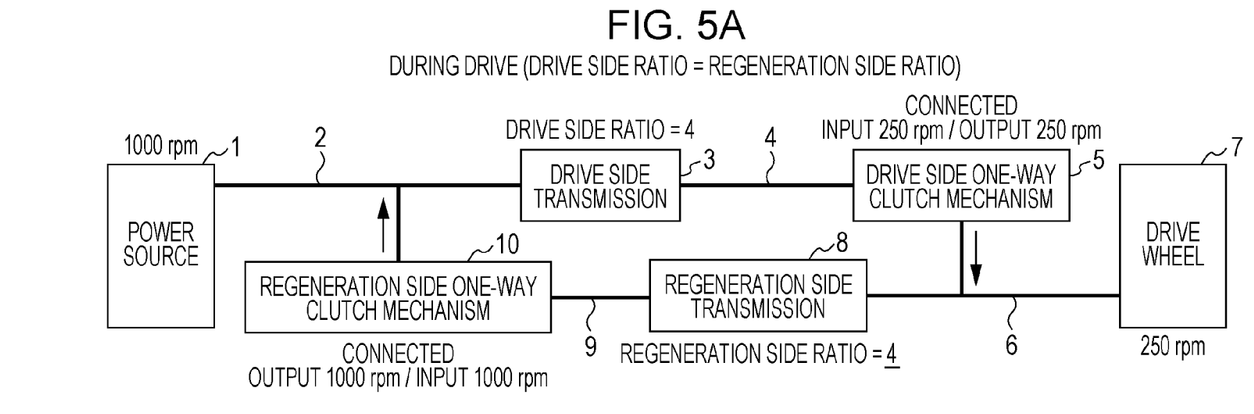
FIG. 5A shows a case where the drive side ratio is equal to the regeneration side ratio.
Figure 5B:
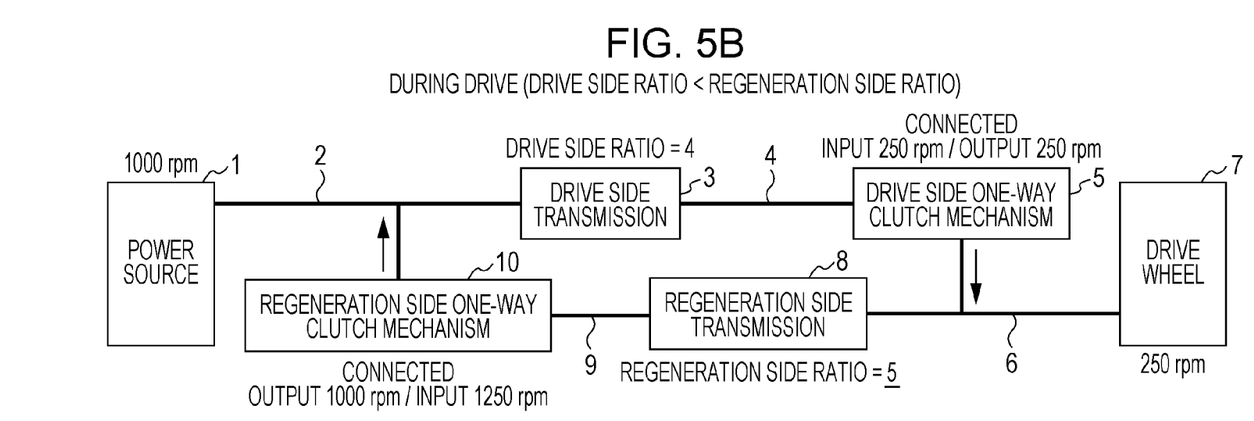
FIG. 5B shows a case where the drive side ratio is smaller than the regeneration side ratio.

Next, with reference to FIGS. 5A and 5B, a description will be given of a state where failure of the power transmission device S according to this embodiment occurs. In FIGS. 5A and 5B, the ECU 20 and others are omitted.

FIG. 5A relates to the power transmission device S and shows a case where the ratio of the drive side transmission 3 (drive side ratio) is equal to the ratio of the regeneration side transmission 8 (regeneration side ratio). As shown in FIG. 5A, in the case where the drive side ratio is equal to the regeneration side ratio (both are 4 in FIG. 5A), the drive side one-way clutch mechanism 5 and the regeneration side one-way clutch mechanism 10 both are connected. However, if there is a discrepancy between the drive side ratio and the regeneration side ratio owing to component error, age-related degradation, or the like, gears and others may be damaged.

FIG. 5B relates to the power transmission device S and shows a case where the ratio of the drive side transmission 3 (drive side ratio) is smaller than the ratio of the regeneration side transmission 8 (regeneration side ratio). As shown in FIG. 5B, since the power source 1 rotates the drive shaft 2 at 1000 rpm, the output shaft 6 is rotated at 250 rpm through the drive side transmission 3, the drive side transmission output shaft 4, and the drive side one-way clutch mechanism 5. On the other hand, since the output shaft 6 rotates at 250 rpm, the output shaft 6 tries to rotate the drive shaft 2 at 1250 rpm through the regeneration side transmission 8, the regeneration side transmission output shaft 9, and the regeneration side one-way clutch mechanism 10.

If the drive side one-way clutch mechanism 5 and the regeneration side one-way clutch mechanism 10 both are connected (see FIGS. 5A and 5B), the gears of the power transmission device S (contained in the transmissions 3 and 8 and the clutch mechanisms 5 and 10) may be damaged, and the drivability of the vehicle (not shown) on which the power transmission device S is mounted may be worsened. For this reason, as shown in FIGS. 4A and 4B, the drive side ratio is set larger than the regeneration side ratio.

Operation of Power Transmission Device

As shown in FIGS. 4A, 4B, 5A, and 5B, the drive side ratio needs to be set larger than the regeneration side ratio. The processing of changing the ratio of the drive side transmission 3 or the regeneration side transmission 8 performed by the ECU 20 will be described with reference to FIGS. 2 and 3.

Figure 2:
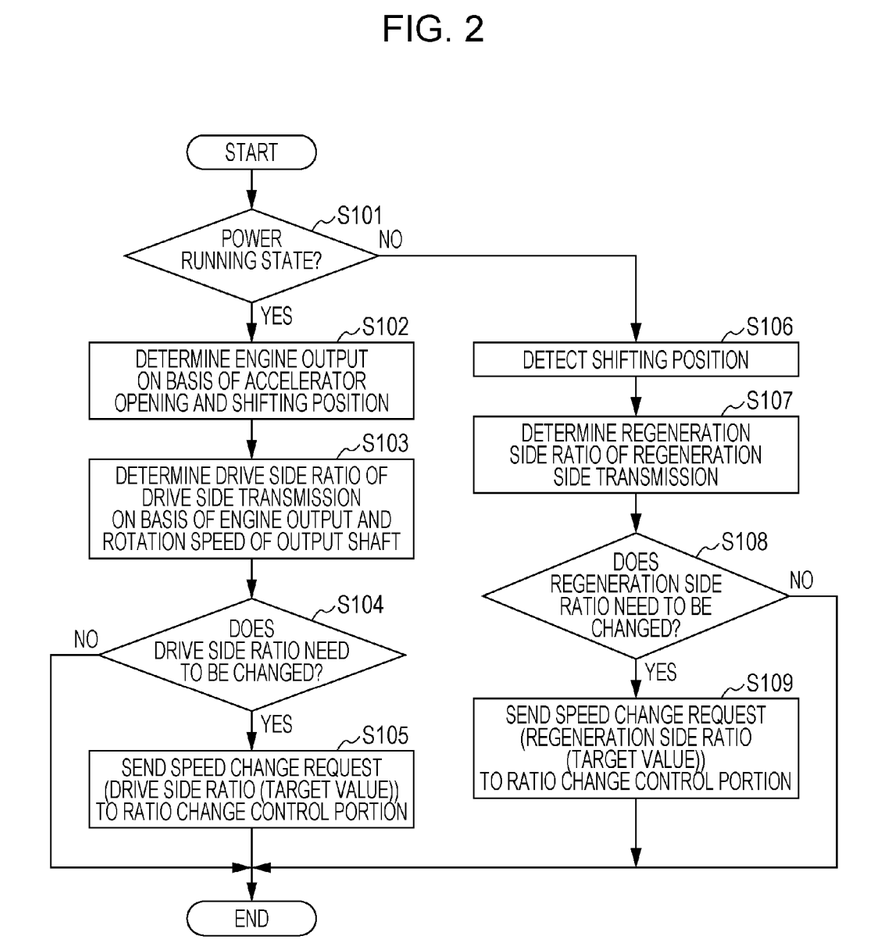
FIG. 2 is a flowchart showing the request for speed change of transmissions performed by an operating state determination portion.

Request for Speed Change of Drive Side Transmission and Regeneration Side Transmission First, with reference to FIG. 2, a description will be given of the request for speed change of the transmissions (the drive side transmission 3 and the regeneration side transmission 8) performed by the operating state determination portion 21 of the ECU 20.

In step S101, the operating state determination portion 21 determines whether or not the power transmission device S is in a power running state. Here, the power running state is a state where drive force is transmitted from the power source 1 (the drive shaft 2) to the drive wheel 7 (the output shaft 6), and is a state where the drive side one-way clutch mechanism 5 is connected. The operating state determination portion 21 determines whether or not the power transmission device S is in a power running state on the basis of the rotation speed of the drive shaft 2 detected by the drive shaft rotation speed detection mechanism 33, the rotation speed of the output shaft 6 detected by the output shaft rotation speed detection mechanism 34, and the ratio of the drive side transmission 3 (drive side ratio). Specifically, the operating state determination portion 21 calculates the rotation speed of the input side of the drive side one-way clutch mechanism 5 on the basis of the rotation speed of the drive shaft 2 detected by the drive shaft rotation speed detection mechanism 33 and the ratio of the drive side transmission 3 (drive side ratio), calculates the rotation speed of the output side of the drive side one-way clutch mechanism 5 on the basis of the rotation speed of the output shaft 6 detected by the output shaft rotation speed detection mechanism 34, compares the rotation speeds of the input and output sides of the drive side one-way clutch mechanism 5, and thereby determines whether or not the drive side one-way clutch mechanism 5 is connected. Alternatively, the operating state determination portion 21 may determine that the power transmission device S is in a power running state when the opening of the accelerator 31 is a predetermined value or more. If the power transmission device S is in a power running state (S101: Yes), the processing of the operating state determination portion 21 proceeds to step S102. If the power transmission device S is not in a power running state (S101: No), the processing of the operating state determination portion 21 proceeds to step S106.

In step S102, the operating state determination portion 21 determines the engine output generated by the power source 1 (or the generated output in the case where the power source 1 is an electric motor) on the basis of the opening of the accelerator 31 and the shifting position 32.

In step S103, the operating state determination portion 21 determines the ratio of the drive side transmission 3 (drive side ratio) on the basis of the engine output (electric motor output) determined in step S102 and the rotation speed of the output shaft 6. Here, the operating state determination portion 21 determines the drive side ratio of the drive side transmission 3 on the basis of a map of the brake specific fuel consumption (BSFC) of the power source 1 such that the power source 1 rotates at such a rotation speed that BSFC is small relative to the required engine output. In the case where the power source 1 is an electric motor, similarly, the operating state determination portion 21 determines the drive side ratio of the drive side transmission 3 such that the electric motor rotates at such a rotation speed that power consumption is low relative to the required electric motor output.

In step S104, the operating state determination portion 21 determines whether or not the ratio of the drive side transmission 3 (drive side ratio) needs to be changed. That is to say, the operating state determination portion 21 determines whether or not the ratio of the drive side transmission 3 (drive side ratio) determined in step S103 is different from the present ratio of the drive side transmission 3. If the drive side ratio needs to be changed (S104: Yes), the processing of the operating state determination portion 21 proceeds to step S105. If the drive side ratio need not be changed (S104: No), the processing of the operating state determination portion 21 is ended.

In step S105, the operating state determination portion 21 sends a speed change request, with the ratio of the drive side transmission 3 determined in step S103 as the drive side ratio (target value), to the ratio change control portion 23 of the ECU 20. Then, the processing of the operating state determination portion 21 is ended.

In step S106, the operating state determination portion 21 detects the shifting position 32.

In step S107, the operating state determination portion 21 determines the ratio of the regeneration side transmission 8 (regeneration side ratio) on the basis of the shifting position 32 detected in step S106. Here, the operating state determination portion 21 determines the regeneration side ratio on the basis of a map showing the correspondence between the shifting position 32 and the regeneration side ratio.

In step S108, the operating state determination portion 21 determines whether or not the ratio of the regeneration side transmission 8 (regeneration side ratio) needs to be changed. That is to say, the operating state determination portion 21 determines whether or not the regeneration side transmission 8 (regeneration side ratio) determined in step S107 is different from the present ratio of the regeneration side transmission 8. If the regeneration side ratio needs to be changed (S108: Yes), the processing of the operating state determination portion 21 proceeds to step S109. If the regeneration side ratio need not be changed (S108: No), the processing of the operating state determination portion 21 is ended.

In step S109, the operating state determination portion 21 sends a speed change request, with the ratio of the regeneration side transmission 8 determined in step S107 as the regeneration side ratio (target value), to the ratio change control portion 23 of the ECU 20. Then, the processing of the operating state determination portion 21 is ended.

Speed Change Control of Drive Side Transmission and Regeneration Side Transmission Next, with reference to FIG. 3, a description will be given of the speed change control (ratio change control) of the transmissions (the drive side transmission 3 and the regeneration side transmission 8) performed by the ratio change control portion 23 of the ECU 20.

In step S201, the ratio change control portion 23 determines whether or not there is a speed change request. Here, "speed change request" means a case where the drive side ratio (target value) or the regeneration side ratio (target value) is input from the operating state determination portion 21 into the ratio change control portion 23 (see step S105 or step S109 of FIG. 2). When the drive side ratio (target value) is different from the drive side ratio (present value), or when the regeneration side ratio (target value) is different from the regeneration side ratio (present value), the ratio change control portion 23 may determine that there is a speed change request. If there is a speed change request (S201: Yes), the processing of the ratio change control portion 23 proceeds to step S202. If there is not a speed change request (S201: No), the processing of the ratio change control portion 23 proceeds to step S211.

In step S202, the ratio change control portion 23 determines whether or not "the speed change request is on the drive side." Here, "the speed change request is on the drive side" means a case where the drive side ratio (target value) is input from the operating state determination portion 21 into the ratio change control portion 23. If the speed change request is on the drive side (S202: Yes), the processing of the ratio change control portion 23 proceeds to step S203. If the speed change request is not on the drive side (S202: No), the processing of the ratio change control portion 23 proceeds to step S207.

In step S203, the ratio change control portion 23 determines whether or not the drive side ratio (target value) is smaller than the regeneration side ratio (present value) plus a predetermined value A. That is to say, the ratio change control portion 23 determines whether or not "drive side ratio (target value)<regeneration side ratio (present value)+A." Here, the predetermined value A is a positive number determined by component tolerance, age-related degradation of components, sensor measuring error, and the like, and is a numerical value for preventing the actual regeneration side ratio from being lower than the actual drive side ratio. If the drive side ratio (target value) is smaller than the regeneration side ratio (present value) plus the predetermined value A (S203: Yes), the processing of the ratio change control portion 23 proceeds to step S204. If the drive side ratio (target value) is not smaller than the regeneration side ratio (present value) plus the predetermined value A (S203: No), the processing of the ratio change control portion 23 proceeds to step S205.

In step S204, the ratio change control portion 23 changes the regeneration side ratio. That is to say, the ratio change control portion 23 changes the transmission ratio of the regeneration side transmission 8 (the regeneration side ratio). Here, the regeneration side ratio (next value), the ratio of the regeneration side transmission 8 after change, is changed so as to be equal to the drive side ratio (target value)−A. That is to say, "regeneration side ratio (next value)=drive side ratio (target value)−A." In the case where the regeneration side transmission 8 is a multi-stage transmission that changes the gear ratio (ratio) in stages, the lowest ratio gear that satisfies "regeneration side ratio (next value)≤drive side ratio (target value)−A" is selected as the regeneration side ratio (next value). In order to prevent the drive side one-way clutch mechanism 5 and the regeneration side one-way clutch mechanism 10 from both being connected, "regeneration side ratio (next value) drive side ratio (target value)−A" needs to be satisfied. Then, the processing of the ratio change control portion 23 proceeds to step S206.

In step S205, the ratio change control portion 23 holds the regeneration side ratio. That is to say, the ratio change control portion 23 does not change but maintains the transmission ratio of the regeneration side transmission 8 (regeneration side ratio). That is to say, "regeneration side ratio (next value) =regeneration side ratio (present value)." Then, the processing of the ratio change control portion 23 proceeds to step S206.

In step S206, the ratio change control portion 23 changes the drive side ratio. That is to say, the ratio change control portion 23 changes the transmission ratio of the drive side transmission 3 (the drive side ratio). Here, the drive side ratio (next value), the ratio of the drive side transmission 3 after change, is changed so as to be equal to the drive side ratio (target value). That is to say, "drive side ratio (next value) =drive side ratio (target value)." Then, the processing of the ratio change control portion 23 is ended.

In step S207, the ratio change control portion 23 determines whether or not the drive side ratio (present value) is smaller than the regeneration side ratio (target value) plus the predetermined value A. That is to say, the ratio change control portion 23 determines whether or not "drive side ratio (present value)<regeneration side ratio (target value)+A." If the drive side ratio (present value) is smaller than the regeneration side ratio (target value) plus the predetermined value A (S207: Yes), the processing of the ratio change control portion 23 proceeds to step S208. If the drive side ratio (present value) is not smaller than the regeneration side ratio (target value) plus the predetermined value A (S207: No), the processing of the ratio change control portion 23 proceeds to step S209.

In step S208, the ratio change control portion 23 changes the drive side ratio. That is to say, the ratio change control portion 23 changes the transmission ratio of the drive side transmission 3 (the drive side ratio). Here, the drive side ratio (next value), the ratio of the drive side transmission 3 after change, is changed so as to be equal to the regeneration side ratio (target value)+A. That is to say, "drive side ratio (next value)=regeneration side ratio (target value)+A." In the case where the drive side transmission 3 is a multi-stage transmission that changes the gear ratio (ratio) in stages, the highest ratio gear that satisfies "drive side ratio (next value) regeneration side ratio (target value)+A" is selected as the drive side ratio (next value). In order to prevent the drive side one-way clutch mechanism 5 and the regeneration side one-way clutch mechanism 10 from both being connected, "drive side ratio (next value)≥regeneration side ratio (target value)+A" needs to be satisfied. Then, the processing of the ratio change control portion 23 proceeds to step S210.

In step S209, the ratio change control portion 23 holds the drive side ratio. That is to say, the ratio change control portion 23 does not change but maintains the transmission ratio of the drive side transmission 3 (drive side ratio). That is to say, "drive side ratio (next value)=drive side ratio (present value)." Then, the processing of the ratio change control portion 23 proceeds to step S210.

In step S210, the ratio change control portion 23 changes the regeneration side ratio. That is to say, the ratio change control portion 23 changes the transmission ratio of the regeneration side transmission 8 (the regeneration side ratio). Here, the regeneration side ratio (next value), the ratio of the regeneration side transmission 8 after change, is changed so as to be equal to the regeneration side ratio (target value). That is to say, "regeneration side ratio (next value)=regeneration side ratio (target value)." Then, the processing of the ratio change control portion 23 is ended.

In step S211, the ratio change control portion 23 holds the drive side ratio and the regeneration side ratio. That is to say, the ratio change control portion 23 does not change but maintains the transmission ratio of the drive side transmission 3 (drive side ratio) and the transmission ratio of the regeneration side transmission 8 (regeneration side ratio). That is to say, "drive side ratio (next value)=drive side ratio (present value)" and "regeneration side ratio (next value)=regeneration side ratio (present value)." Then, the processing of the ratio change control portion 23 is ended.

Advantageous Effects of Power Transmission Device

Such a power transmission device S provides the following advantageous effects.

As shown in FIG. 1, although the power transmission device S has the drive side transmission 3 provided with the drive side one-way clutch mechanism 5, the power transmission device S has the regeneration side transmission 8 and the regeneration side one-way clutch mechanism 10, and is therefore capable of recovery from the output shaft 6 (the drive wheel 7) to the drive shaft 2 (the power source 1) (see FIG. 4B) without increasing the size of the power transmission device S. Thus, although the power transmission device S has the transmission provided with the one-way clutch mechanism, engine braking that recovers drive force from the output shaft 6 (the drive wheel 7) to the drive shaft 2 (the power source 1) can be used. In the case where the power source 1 is an electric motor, regeneration can be performed.

Figure 3:
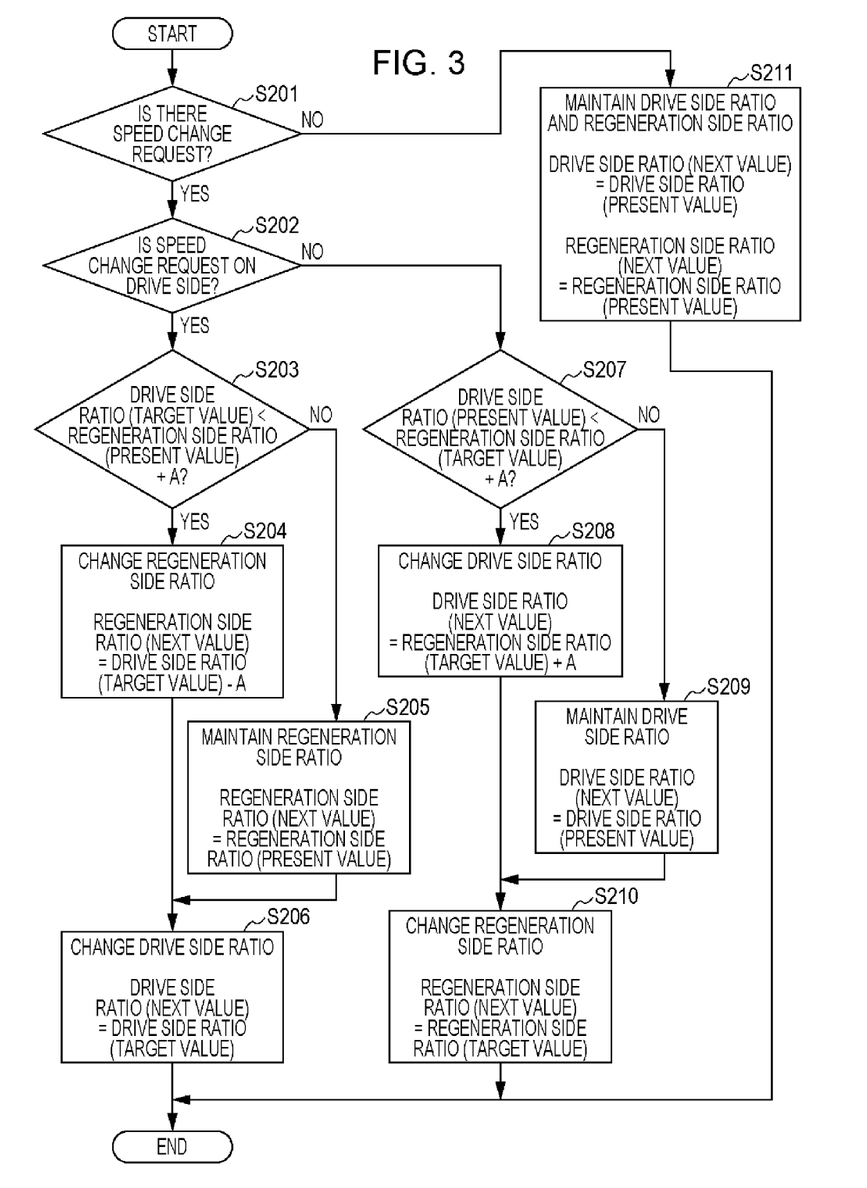
FIG. 3 is a flowchart showing the speed change control of the transmissions performed by a ratio change control portion.

Before changing the ratio of the transmission on the side where there is a change request (the drive side transmission 3 or the regeneration side transmission 8), the ratio change control portion 23 of the ECU 20 determines whether the condition "the drive side ratio is larger than the regeneration side ratio by the predetermined value A or more" is satisfied if the ratio is changed according to the change request (see S203 and S207 of FIG. 3). If the condition is satisfied (see S203: No and S207: No of FIG. 3), the ratio change control portion 23 changes the ratio of the transmission on the side where there is the change request (the drive side transmission 3 or the regeneration side transmission 8) according to the change request. If the condition is not satisfied (see S203: Yes and S207: Yes of FIG. 3), the ratio change control portion 23 first changes the ratio of the transmission on the side opposite to the side where there is the change request (the regeneration side transmission 8 or the drive side transmission 3) (see S204 and S208 of FIG. 3), and then changes the ratio of the transmission on the side where there is the change request (the drive side transmission 3 or the regeneration side transmission 8) according to the change request (see S206 and S210 of FIG. 3).

Thus, in response to a speed change request of the operating state determination portion 21 of the ECU 20, the transmission ratios of the drive side transmission 3 and the regeneration side transmission 8 (the drive side ratio and the regeneration side ratio) can be changed. In addition, since the relation "the drive side ratio is larger than the regeneration side ratio" is maintained, damage to drive train components in the case where a mismatch in rotation speed occurs with both the drive side one-way clutch mechanism 5 and the regeneration side one-way clutch mechanism 10 connected as shown in FIGS. 5A and 5B can be prevented, and damage to the power transmission device S and the worsening of the drivability of the vehicle (not shown) on which the power transmission device S is mounted can be prevented.

The embodiment provides a power transmission device that has a one-way power transmission mechanism (one-way clutch mechanism) and a transmission unit capable of transmission only in one direction and that is capable of regeneration, and a method for controlling the same.

In the embodiment, a power transmission device includes a drive shaft, a driven shaft, a first transmission unit that changes the power of the drive shaft, a first one-way power transmission mechanism that transmits the power changed by the first transmission unit only in one direction to the driven shaft, a second transmission unit that changes the power of the driven shaft, a second one-way power transmission mechanism that transmits the power changed by the second transmission unit only in one direction to the drive shaft, and a control unit that changes the ratios of the first transmission unit and the second transmission unit. The control unit makes the ratio of the first transmission unit larger than the ratio of the second transmission unit.

Such a power transmission device can change the rotation of the drive shaft with the first transmission unit and can drive the driven shaft through the first one-way power transmission mechanism. Such a power transmission device can change the rotation of the driven shaft with the second transmission unit and can transmit the changed rotation to the drive shaft through the second one-way power transmission mechanism. Since making the ratio of the first transmission unit larger than the ratio of the second transmission unit can prevent the first one-way power transmission mechanism and the second one-way power transmission mechanism from both being connected (at the same time), damage to the power transmission device can be prevented. In the case where the power transmission device is mounted on a vehicle, the drivability of the vehicle is not worsened.

It is preferable that if the ratio of the first transmission unit after change is smaller than the present ratio of the second transmission unit plus a predetermined value when the control unit changes the ratio of the first transmission unit, the control unit change the ratio of the second transmission unit such that the ratio of the second transmission unit is smaller than the ratio of the first transmission unit after change by the predetermined value or more, and then change the ratio of the first transmission unit.

In such a power transmission device, even during change of the ratio of the first transmission unit, the ratio of the first transmission unit is kept larger than the ratio of the second transmission unit by the predetermined value or more. Thus, even during change of the ratio, damage to drive train components in the case where a mismatch in rotation speed occurs with both the first one-way power transmission mechanism and the second one-way power transmission mechanism connected can be prevented.

It is preferable that if the present ratio of the first transmission unit is smaller than the ratio of the second transmission unit after change plus a predetermined value when the control unit changes the ratio of the second transmission unit, the control unit change the ratio of the first transmission unit such that the ratio of the first transmission unit is larger than the ratio of the second transmission unit after change by the predetermined value or more, and then change the ratio of the second transmission unit.

In such a power transmission device, even during change of the ratio of the second transmission unit, the ratio of the first transmission unit is kept larger than the ratio of the second transmission unit by the predetermined value or more. Thus, even during change of the ratio, damage to drive train components in the case where a mismatch in rotation speed occurs with both the first one-way power transmission mechanism and the second one-way power transmission mechanism connected can be prevented.

It is preferable that the first transmission unit convert a rotational motion into a rocking motion using a lever crank mechanism.

Such a power transmission device can transmit a rocking motion through the first one-way power transmission mechanism to the driven shaft, using the lever crank mechanism that converts a rotational motion into a rocking motion as the first transmission unit.

In the embodiment, a method for controlling a power transmission device including a drive shaft, a driven shaft, a first transmission unit that changes the power of the drive shaft, a first one-way power transmission mechanism that transmits the power changed by the first transmission unit only in one direction to the driven shaft, a second transmission unit that changes the power of the driven shaft, a second one-way power transmission mechanism that transmits the power changed by the second transmission unit only in one direction to the drive shaft, and a control unit that changes the ratios of the first transmission unit and the second transmission unit, includes making the ratio of the first transmission unit larger than the ratio of the second transmission unit.

Such a method for controlling a power transmission device can change the rotation of the drive shaft with the first transmission unit and can drive the driven shaft through the first one-way power transmission mechanism. Such a method for controlling a power transmission device can change the rotation of the driven shaft with the second transmission unit and can transmit the changed rotation to the drive shaft through the second one-way power transmission mechanism. Since making the ratio of the first transmission unit larger than the ratio of the second transmission unit can prevent the first one-way power transmission mechanism and the second one-way power transmission mechanism from both being connected (at the same time), damage to the power transmission device can be prevented. In the case where the power transmission device is mounted on a vehicle, the drivability of the vehicle is not worsened.

The embodiment can provide a power transmission device that has a one-way power transmission mechanism (one-way clutch mechanism) and a transmission unit capable of transmission only in one direction and that is capable of regeneration, and a method for controlling the same.

Obviously, numerous modifications and variations of the present invention are possible in light of the above teachings. It is therefore to be understood that within the scope of the appended claims, the invention may be practiced otherwise than as specifically described herein.

What is claimed is:

1. A power transmission apparatus comprising:
   a drive shaft;
   a driven shaft;
   a first transmission device to change power of the drive shaft;
   a first one-way power transmission mechanism which transmits power changed by the first transmission device only in one direction to the driven shaft if a rotational speed of the drive shaft exceeds a rotational speed of the driven shaft and which does not transmit drive force if the rotational speed of the drive shaft is less than the rotational speed of the driven shaft;
   a second transmission device to change power of the driven shaft;
   a second one-way power transmission mechanism which transmits power changed by the second transmission device only in one direction to the drive shaft if a rotational speed of the driven shaft exceeds a rotational speed of the drive shaft and which does not transmit drive force if the rotational speed of the driven shaft is less than the rotational speed of the drive shaft; and
   a controller configured to change ratios of the first transmission device and the second transmission device, a ratio of the first transmission device being calculated by dividing the rotational speed of the drive shaft by the rotational speed of the driven shaft, a ratio of the second transmission device being calculated by dividing the rotational speed of the drive shaft by the rotational speed of the driven shaft, the controller being configured to control the ratios of the first transmission device and the second transmission device such that the ratio of the first transmission device is larger than the ratio of the second transmission device.

2. The power transmission apparatus according to claim 1, wherein if the ratio of the first transmission device after change is smaller than a present ratio of the second transmission device plus a predetermined value when the controller changes the ratio of the first transmission device, the controller changes the ratio of the second transmission device such that the ratio of the second transmission device is smaller than the ratio of the first transmission device after change by at least the predetermined value, and changes the ratio of the first transmission device after changing the ratio of the second transmission device.

3. The power transmission apparatus according to claim 1, wherein if a present ratio of the first transmission device is smaller than the ratio of the second transmission device after change plus a predetermined value when the controller changes the ratio of the second transmission device, the controller changes the ratio of the first transmission device such that the ratio of the first transmission device is larger than the ratio of the second transmission device after change by at least the predetermined value, and changes the ratio of the second transmission device after changing the ratio of the first transmission device.

4. The power transmission apparatus according to claim 1, wherein the first one-way power transmission mechanism and the second one-way power transmission mechanism are prevented from both being connected at a same time.

5. A method for controlling a power transmission apparatus including a drive shaft, a driven shaft, a first transmission device to change power of the drive shaft, and a second transmission device to change power of the driven shaft, said method comprising:

providing a first one-way power transmission mechanism which transmits power changed by the first transmission device only in one direction to the driven shaft if a rotational speed of the drive shaft exceeds a rotational speed of the driven shaft and which does not transmit drive force if the rotational speed of the drive shaft is less than the rotational speed of the driven shaft;

providing a second one-way power transmission mechanism which transmits power changed by the second transmission device only in one direction to the drive shaft if a rotational speed of the driven shaft exceeds a rotational speed of the drive shaft and which does not transmit drive force if the rotational speed of the driven shaft is less than the rotational speed of the drive shaft; and making a ratio of the first transmission device larger than a ratio of the second transmission device, wherein the ratio of the first transmission device is calculated by dividing the rotational speed of the drive shaft by the rotational speed of the driven shaft, and the ratio of the second transmission device is calculated by dividing the rotational speed of the drive shaft by the rotational speed of the driven shaft.

6. The method according to claim 5, wherein, if the ratio of the first transmission device after change is smaller than a present ratio of the second transmission device plus a predetermined value when the ratio of the first transmission device is changed, then the ratio of the second transmission device is changed such that the ratio of the second transmission device is smaller than the ratio of the first transmission device after change by at least the predetermined value, and the ratio of the first transmission device is changed after changing the ratio of the second transmission device.

7. The method according to claim 5, wherein, if a present ratio of the first transmission device is smaller than the ratio of the second transmission device after change plus a predetermined value when the ratio of the second transmission device is changed, then the ratio of the first transmission device is changed such that the ratio of the first transmission device is larger than the ratio of the second transmission device after change by at least the predetermined value, and the ratio of the second transmission device is changed after changing the ratio of the first transmission device.

8. The method according to claim 5, wherein the first one-way power transmission mechanism and the second one-way power transmission mechanism are prevented from both being connected at a same time.

* * * * *